Patented Oct. 26, 1948

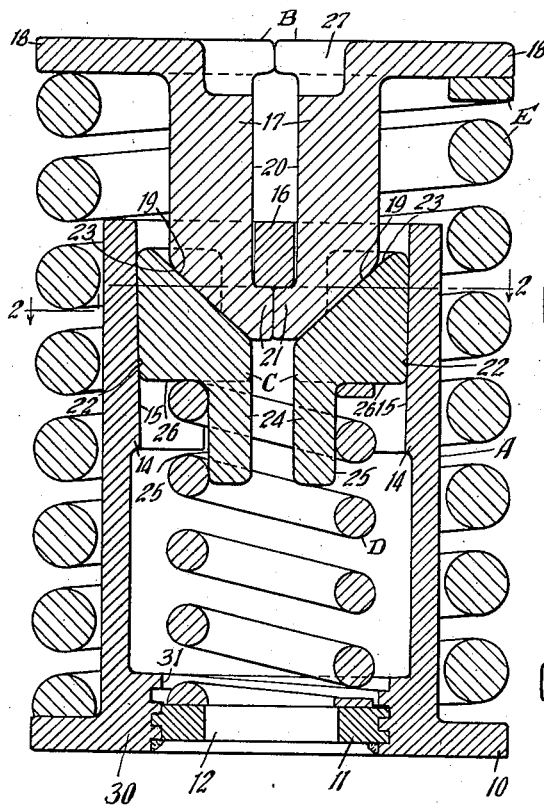
Fig.1
Fig.2
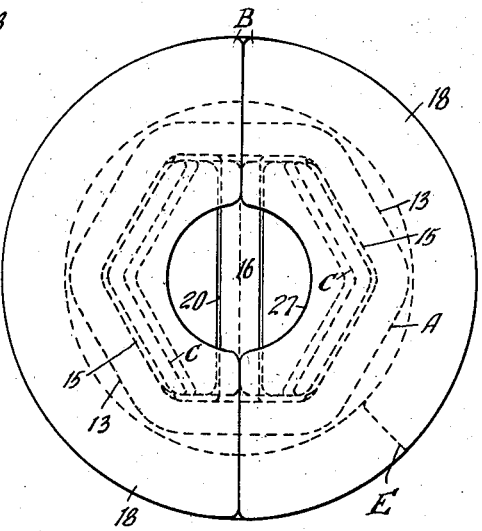
Fig.3
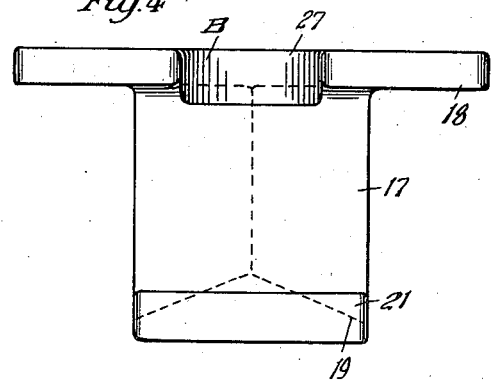
Fig.4
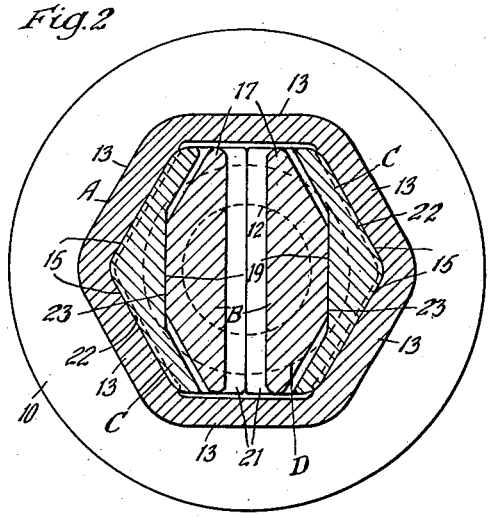
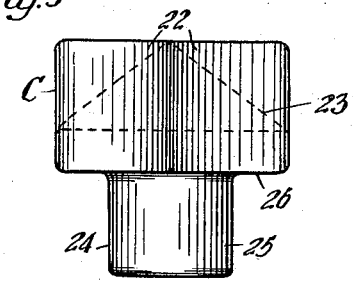
Fig.5
Inventor
George E. Dath
By Henry Fuchs
Atty.

2,452,108

UNITED STATES PATENT OFFICE 2,452,108

FRICTION SHOCK ABSORBING MECHANISM

George E. Dath, Chicago, Ill., assignor to W. H. Miner, Inc., Chicago, Ill., a corporation of Delaware Application February 10, 1944, Serial No. 521,786

5 Claims. (Cl. 267—9)

This invention relates to improvements in friction shock absorbing mechanisms, especially adapted for use in connection with railway car trucks for snubbing the action of the usual truck springs.

One object of the invention is to provide a friction shock absorbing mechanism comprising a friction casing; a friction clutch comprising friction shoes and wedge means slidable within the casing; and spring resistance means comprising a spring within the casing opposing inward movement of the clutch, and a spring surrounding the casing opposing inward movement of the wedge means, wherein the wedge means comprises a two part wedge block, the sections of which have shouldered engagement with retaining means on the casing to limit outward movement of the wedge block and hold the mechanism assembled.

Another object of the invention is to provide a friction shock absorbing mechanism comprising a friction casing; a friction clutch slidable within the casing, including friction shoes and a pressure transmitting wedge; and a spring within the casing yieldingly opposing inward movement of the clutch, wherein the shoes are provided with means for holding the spring centered.

Other objects of the invention will more clearly appear from the description and claims hereinafter following.

In the drawing forming a part of this specification, Figure 1 is a transverse vertical sectional view of my improved friction shock absorber. Figure 2 is a horizontal sectional view, corresponding substantially to the line 2—2 of Figure 1. Figure 3 is a top plan view of Figure 1. Figure 4 is an elevational view of one of the sections of the two part wedge block of the improved friction shock absorber, the section of the block illustrated being that at the right hand side of Figure 1, looking from left to right in said figure. Figure 5 is an elevational view of the shoe at the right hand side of the mechanism, as seen in Figure 1, looking from right to left in said figure.

My improved shock absorber comprises broadly a friction casing A; a two part sectional wedge B; a pair of friction shoes C—C; an inner spring resistance D within the casing; and an outer spring resistance E surrounding the casing.

The casing A is in the form of a hexagonal shell having a bottom wall 30 provided with an opening 31, and a laterally, outwardly projecting, annular flange 10 at its outer or lower end. The outer or lower end of the casing is closed by a ring 11, which has screw threaded engagement within the lower portion of the opening 31. The opening above the ring 11 provides a seat for the inner spring D to hold the same centered. In the assembled condition of the mechanism, the ring 11 is secured against accidental rotation by being welded to said casing, as shown in Figure 1. The opening of the ring 11, which is indicated by 12, is of such a size as to accommodate the usual spring centering projection of the lower spring follower plate of a cluster of truck springs.

The outer or upper end of the casing A is open, as clearly shown in Figure 1. The six side walls of the casing, which are indicated by 13—13—13—13—13—13 at said open end, define the friction shell section thereof. As shown in Figures 1 and 2, at opposite sides of the casing, that is, at the left and right hand sides thereof, the adjacent walls 13—13 are inwardly thickened, as indicated at 14. The opposed sets of walls 13—13 present two interior friction surfaces 15—15 at opposite sides of the casing, which are of V-shaped, transverse cross section. The friction surfaces 15—15 preferably converge inwardly of the casing, as clearly shown in Figure 1. The remaining two side walls 13—13 of the casing, that is, the upper and lower walls, as seen in Figure 2, are parallel in a direction lengthwise of the mechanism. A transverse, barlike, heavy, central web 16 connects these parallel walls, at the mouth of the casing, said web extending from the inner side of one of said walls to the inner side of the other, and forming the retaining and stop means for the wedge B, as hereinafter pointed out. The outer surface of the barlike web 16 is preferably flush with the outer ends of the walls 13 of the casing.

The wedge B is divided along the longitudinal central plane of the mechanism and comprises two similar block sections 17—17. At its upper or outer end, the wedge B has a laterally projecting, annular flange 18, half of which is formed on each section 17. The wedge proper is of hexagonal, exterior cross section and has two inwardly converging, flat wedge faces 19—19 at the opposite sides thereof. The wedge faces are at the inner end of the wedge, one face being provided on each section 17 thereof. The inner sides of the sections 17—17 of the wedge are cut out, between the upper and lower ends thereof to provide a longitudinally extending slot 20 adapted to receive the transverse web 16 of the casing A. The slot 20 is closed at the upper and lower ends, thus presenting transverse shoulders 21—21 at the lower ends of the sections 17—17 engaging underneath the web 16 to limit outward movement of the wedge.

The friction shoes C are two in number and are disposed at opposite sides of the mechanism, being interposed between the wedge faces 19—19 of the wedge and the V-shaped friction surfaces 15—15 of the casing.

Each shoe C has a V-shaped, outer friction surface 22, slidably engaging the V-shaped friction surface 15 at the corresponding side of the casing A. On the inner side, each shoe has a flat wedge face 23, correspondingly inclined to and engaging the wedge face 19 at the same side of the wedge. Each shoe also has a rearwardly extending centering lug or arm 24 thereon. The centering lug 24 of each shoe is at the lateral inner side thereof and has a lengthwise extending, transversely curved, outer surface 25, the surfaces 25—25 of the two lugs of the shoes being concentric and together forming centering means for the inner spring D of the mechanism. As shown most clearly in Figure 2, clearance is provided between the walls 13—13 of the casing and the shoes, at opposite sides of the latter, that is, between the shoes and the walls at the upper and lower sides of the casing, as illustrated in Figure 2.

The spring D is disposed within the casing A, being interposed between the inner ends of the shoes C—C and the rear or lower end of the casing, as seen in Figure 1, bearing at its upper end on flat, transverse, rear, abutment faces 26—26 of the shoes and at its lower end on the ring 11 which closes the lower end of the opening 31. The lower end of the spring D is held centered by being seated in the opening 31 and the upper end surrounds the lugs 24—24 of the shoes, the lugs snugly fitting within the spring to hold the same centered.

The outer spring E, which is heavier than the spring D, surrounds the casing A and bears at its top and bottom ends on the flanges 18 and 10 of the wedge and shoes, respectively, yieldingly resisting relative movement of the wedge B and casing A toward each other.

The springs D and E are preferably under initial compression.

In assembling the mechanism, the spring D is first placed within the casing A, being entered through the rear or bottom end thereof before application of the ring 11, the opening of the casing which receives the ring being of a size to freely admit the spring. The shoes C—C are then placed on top of the spring D, being entered through the open top end of the casing. The outer spring E is next engaged over the casing A and seated on the flange 10 of the latter. The two part sectional wedge B is then assembled with the other parts of the mechanism, by entering the wedge portion thereof within the upper end of the spring E, the sections 17—17 of the wedge being held spread apart at their lower ends so that the shoulders 21—21 will clear the barlike retaining web 16 of the casing. The split wedge is forced downwardly against the shoes C—C, compressing the spring D and the spring E, until the shoulders 21—21 pass beyond and snap under the web 16 of the casing, the wedge sections being pressed laterally toward each other due to the wedging action between the same and the shoes.

The operation of my improved shock absorbing mechanism is as follows: Upon compression of the mechanism, the split wedge B is forced inwardly of the casing, spreading the shoes apart and sliding the same along the friction surfaces of the casing, opposed by the spring D. High frictional resistance is thus provided during operation of the mechanism. Inward movement of the wedge is also resisted by the outer spring E, the resistance of the spring being added to the frictional resistance provided by the spring resisted clutch, comprising the wedge B and shoes C—C.

In release of the mechanism, the springs D and E return all of the parts to normal position, the spring E directly forcing the wedge B outwardly and the spring D indirectly forcing the same outwardly through its action on the shoes C—C.

Outward movement of the wedge B is positively limited by engagement of the shoulders 21—21 of the sections 17—17 thereof with the barlike web 16 of the casing, thus limiting expansion of the mechanism.

My improved shock absorber, when employed as a snubbing or dampening device for railway car truck springs is substituted for one or more of the spring units of the usual truck spring cluster, being interposed between the usual top and bottom spring plates of the cluster, the split wedge B being recessed, as indicated at 27, to receive the usual spring centering projection of the upper spring plate of the cluster, and the aligned centering projection of the lower spring plate being received by the opening of the ring 11, which closes the bottom of the casing A.

As will be evident, my improved friction shock absorbing mechanism, as employed in a truck spring cluster, effectively dampens or snubs the action of the truck springs in both compression and recoil thereof.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing open at one end and having interior friction surfaces at said open end; of a lengthwise split wedge block, said casing and block being movable lengthwise with respect to each other, said block comprising two like sections; a stop web extending transversely across the open end of the casing, and directly connecting the opposite side walls thereof; shoulders on the inner sides of the sections of the wedge engageable in back of said web to limit outward movement of the wedge; friction shoes within the casing having sliding engagement with the friction surfaces thereof and wedging engagement with the wedge; and spring means within the casing yieldingly opposing inward movement of the shoes.

2. In a friction shock absorbing mechanism, the combination with a friction casing open at one end and having interior friction surfaces at said open end; of a friction clutch slidingly telescoped within the casing, said clutch including a longitudinally split wedge, and friction shoes in wedging engagement with the wedge and in sliding frictional engagement with the friction surfaces of the casing, said wedge being longitudinally slotted, the slot being formed partly in each section of the wedge, shoulders at the inner end of said slot on said sections of the wedge; a fixed retaining web on the casing extending transversely of the opening thereof and through the slot of said sectional wedge, said web rigidly connecting opposite side walls of the casing, said web being engaged by the shoulders of the sections of the wedge to restrict outward movement of the wedge; and spring means within the casing opposing inward movement of the clutch.

3. In a friction shock absorbing mechanism, the combination with a friction casing having a laterally projecting flange at one end thereof and being open at the other end; of a barlike web extending across the opening of said casing said web connecting and being rigid with the opposite side walls of the casing; opposed interior friction surfaces at the open end of said casing at opposite sides of said web; a pair of friction shoes within the casing engaging said opposed friction surfaces; a spring within the casing opposing inward movement of said shoes; a longitudinally split wedge having wedging engagement with said shoes, said wedge having a laterally projecting flange at the outer end thereof, each section of said wedge having a shoulder at the inner end thereof engaging in back of said web to limit outward movement of the sectional wedge; and spring means surrounding said casing and bearing at its opposite ends on the flanges of the casing and sectional wedge.

4. In a friction shock absorbing mechanism, the combination with a hexagonal friction casing open at one end and having interior, opposed, V-shaped friction surfaces at said open end; of a lengthwise split wedge block, said casing and block being movable lengthwise with respect to each other, said block comprising two like sections; a fixed stop web extending transversely across the open end of the casing, said web connecting and being rigid with the opposite side walls of the casing; shoulders on the inner sides of the sections of the wedge engageable in back of said web to limit outward movement of the wedge; friction shoes within the casing having V-shaped friction surfaces in sliding engagement with the friction surfaces thereof and wedging engagement with the wedge; and spring means within the casing yieldingly opposing inward movement of the shoes.

5. In a friction shock absorbing mechanism, the combination with a friction casing open at one end and having a pair of opposed, interior, V-shaped friction surfaces at said open end; of a friction clutch slidingly telescoped within the casing, said clutch including a longitudinally split wedge, and friction shoes in wedging engagement with the wedge and in sliding frictional engagement with the friction surfaces of the casing, said wedge being longitudinally slotted, the slot being formed partly in each section of the wedge, shoulders at the inner end of said slot on said sections of the wedge; a fixed retaining web on the casing extending transversely of the opening thereof and through the slot of said sectional wedge, said web directly connecting opposed side walls of the casing, said web being engaged by the shoulders of the sections of the wedge to restrict outward movement of the wedge; and spring means within the casing opposing inward movement of the clutch.

GEORGE E. DATH.

REFERENCES CITED

The following references are of record in the file of this patent:

UNITED STATES PATENTS

| Number | Name | Date |
|---|---|---|
| 1,442,893 | Lewis | Jan. 23, 1923 |
| 1,674,824 | Haseltine | June 26, 1928 |
| 1,695,500 | O'Connor | Dec. 18, 1928 |
| 2,050,541 | Olander | Aug. 11, 1936 |
| 2,198,261 | Barrows et al. | Apr. 23, 1940 |
| 2,279,914 | Cottrell | Apr. 14, 1942 |
| 2,335,847 | Dath | Dec. 7, 1943 |

FOREIGN PATENTS

| Number | Country | Date |
|---|---|---|
| 4,120 | Great Britain, 1913 | Feb. 18, 1914 |